3,354,082
EFFLUENT WATER PURIFICATION PROCESS
Max Dubach, Riedholz, Switzerland, assignor to Cellulosefabrik Attisholz A.G. vormals Dr. B. Sieber, Attisholz, Switzerland
No Drawing. Filed Mar. 4, 1965, Ser. No. 437,274
Claims priority, application Switzerland, Mar. 10, 1964, 3,074/64
1 Claim. (Cl. 210—15)

The invention relates to a process for the purification of effluent water, more particularly to the micro-biological purification of water by means of an activated sludge.

In the biological purification of effluent water or sewage, such as the effluents from house pipe drains a large surplus of sludge must be withdrawn for optimum operating efficiency of the purification plant. This sludge stems in part from the suspended solids in the said effluents and is in part produced by micro-organisms during the decomposition of organic substances. Since, at present, the removal of this surplus sludge leads to ever increasing difficulties processes have been developed to reduce the amounts of sludge.

An example for such a process is the so called total purification plant. This process benefits from the capacity of micro-organisms to undergo decomposition if aerated for sufficient time in the sludge tank.

This auto-decomposition or mineralization leads to a conversion of the organic substance, predominantly into carbon dioxide and nitrogen. This known process is operated such that the effluent water is continuously fed into the aeration tank or activated sludge tank of the purification plant, normally without a preliminary purification or sedimentation step. In this tank the effluent is aerated together with the micro-organisms which effect the decomposition, and the aeration time generally is in the range of from 4–24 hours, based on the amount of feed effluent. During this period the organic substances present in the effluent are decomposed and, at the same time, a partial mineralization or auto-decomposition of the multiplying micro-organisms is effected due to the extended aeration.

The secondary or sludge containing effluent from the aerating tank is fed into a subsequent sedimentation tank for sedimentation of the sludge; thet sediment sludge is then collected as a concentrate in a manner well known in the art of water purification. The sediment sludge is recirculated into the aerating tank. The purified effluent from the sedimentation tank is then led into the drainage or river, if desired after a second purification step. The aim of recirculating the sedimented sludge into the activated sludge tank is an increase of the residence time by increasing its concentration thereby effecting a further demineralization. In this way the amount of sludge produced can be reduced by a factor of 0.5, or even 0.2, compared with the amounts obtained from the conventional water purification by means of activated sludge, the reduction being dependent from the residence time in the aerating tank.

However, this process has some grave disadvantages. Due to the extended residence time of from 4–24 hours (based on the feed effluent) necessary for a substantial demineralization the aerating tank must be extremely large and, hence, is costly. Also, the residence time of the sludge in the aerating tank is rather narrowly limited due to the recirculation of the sludge in a concentrated form from the sedimentation tank. Generally, the maximum concentration of the sedimented sludge in the sedimentation tank is about 20,000 milligrams sludge (dry substance or solids) per liter. If this sludge is recirculated into the aerating tank a total concentration together with the feed effluent of from 8000–10,000 milligrams per liter (mg./l.) is obtained. Higher concentrations are not operable if the sedimentation of the sludge in the sedimentation tank is not to be impaired. Further draw-back of the said process is the necessity to employ very large amounts of air which are required for large volumina of the aerated mass. These excessive amounts of air have in part, only an agitating function to prevent sedimentation of the sludge in the aerating tank. A further disadvantage of the said process is the fact that the mineralization of the sludge is effected in the water to be purified. As a consequence thereof the phosphororganic compounds, which for example may be generated by the demineralization process, are led into the river together with the effluent from the purification plant.

It is a primary object of the present invention to avoid the above discussed disadvantages. Further objects will become apparent as the specification proceeds.

These objects are achieved in the process of the invention for mineralization of sludge from the biological purification of effluent water by withdrawing the sludge surplus, i.e. that sludge portion which is not used for maintaining the required sludge concentration for the biological purification of effluent water, and aerating the said surplus sludge in a separate tank to effect a sludge mineralization.

In the process of the invention the actual biological purification of the effluent water on one hand and the mineralization of the sludge by subsequent aeration on the other hand is effected in two entirely separated steps.

The actual biological purification of the effluent water according to the activated sludge process is carried out such that an optimum decomposition of the organic impurities or contaminants in the effluent water is achieved at a minimum residence time in the aerating tank, the mineralization of the sludge from the sedimentation tank being, however, effected at a high sludge concentration in a separate aerating tank. Accordingly, the residence time of the effluent water to be purified may be substantially shortened; on the other hand, the residence time of the sludge for its mineralization may be achieved with a reduced volume due to the higher concentration in the separate aerating tank. Consequently, the reaction volume may be reduced considerably. In addition, the separate sludge mineralization avoids that, for example, any phosphates produced by mineralization are carried into the purified water.

An additional advantage is based on the fact that due to the shorter residence time of the effluent water to be purified in the aerating tank considerably smaller amounts of air are consumed since only so much air must be added as is necessary for an optimum operation of the process.

In the process of the invention the effluent water which is to be purified by the biological process is led continuously into the aerating tank, preferably without a preliminary purification. In the aerating tank the effluent water is aerated during a period of from 15 minutes to 2 hours, preferably 30 minutes, at a sludge concentration of from 3000–10,000 milligrams per liter. The aeration may be effected by known means and in a manner known per se. After this biological purification step the effluent is fed into the subsequent sedimentation tank where the sedimented sludge is collected at a predetermined point in known manner. A sufficient sludge portion for maintaining the desired sludge concentration, e.g. 6000 milligrams of sludge solids per liter, is recirculated from said concentrated sludge sediment into the aerating tank of the purification step.

The surplus sludge beyond the said recirculated sludge portion now is withdrawn from this system, preferably from the sedimentation tank subsequently or in a downstream direction from said purification step, and fed in a separate aerating or mineralizating tank for mineralization of the sludge. This may either be effected by further concentrating the sludge in a sludge concentrating apparatus and in a manner known per se, and feeding only the concentrated sludge portion into the mineralizing tank, or by directly feeding the surplus sludge into the mineralizating tank. In this latter case the mineralizating tank is provided with known means to enable a further concentration of the sludge. The sludge concentration in the mineralizating tank should be in the range of from 10,000 milligrams to 80,000 milligrams sludge solids (i.e. calculated on a dry basis) per liter, preferably 40,000 mg./l.

It has been found that this method provides particular advantages if the actual purification step is effected such that the effluent water in the subsequent sedimentation tank is substantially devoid of free oxygen ($O_2$). A surplus sludge with an extremely high bacteria content is thereby obtained, such a sludge being capable of an accelerated mineralization in the mineralizating tank, in other words, a sludge from a purification step with an oxygen surplus cannot be as rapidly mineralized since such a sludge normally contains predominantly bacteriphagic organisms, e.g. protozoae. Consequently, if the surplus sludge originates from a water purification plant in which the decomposition of organic impurities is effected in a first step by means of bacteriae and in which the additionally developed bacteriae are eliminated in a separate second step, the sludge surplus preferably is withdrawn between said first and said second step and fed into the mineralizating tank.

The division of the actual water purification process from the mineralization process by aeration according to the invention provides a substantial decrease of the necessary tank capacities, compared with the capacities necessary in the known processes. In addition the invention affords a reduction of the final sludge amount down to ⅓–⅙ of the final sludge amount produced obtained by the known purification processes.

The following example is given by way of illustration and not limitation.

A given effluent water from a plurality of households in an amount of 500 cubic meters per day contains waste substance from 1000 inhabitants; this would correspond to about 75 grams of sludge per capita and day if processed in a conventional biological purification plant. The amount of effluent water per hour would greatly vary, say up to 40 cubic meters during the day and down to 10 cubic meters during the night.

In carrying out the process of the invention the effluent water is fed continuously and without preliminary purification into an aerating tank with a capacity of 20 cubic meters so that the residence time during day time would be about 30 minutes and during the night about 2 hours. The sludge concentration is kept at 4000–6000 milligrams of dry sludge substance (sludge solids) per liter by pumping sludge from the subsequent or downstream sedimentation tank into the aerating tank. Air is introduced into the aerating tank 4 meters below the surface in large bubbles at a rate of 50 cubic meters per hour. In the aerating tank an oxygen content of about 2 milligrams per liter is obtained. After this treatment the water is continuously fed from the aerating tank into the subsequent sedimentation tank which has a capacity of 100 cubic meters and is arranged in a known manner to permit collection of the sedimented sludge at a predetermined point in a concentration of about 20,000 milligrams of sludge (dry basis) per liter so that it can be recirculated into the aerating tank for maintaining the desired sludge concentration in the latter. At a sludge concentration of 5000 mg./l. the total sludge content of the system is about 200 kilograms (dry basis), i.e. about 100 kg. in the aerating tank and about 100 kg. in the sedimentation tank. Under the given operating conditions the amount of sludge increases at a rate of 40 kilograms per day. In order to maintain the desired sludge concentration in the purification step these 40 kilograms must be withdrawn as surplus sludge. The surplus sludge, therefore, is fed from the sedimentation tank at a rate of about 20,000 mg./l. into the aerated mineralizating tank which has a capacity of 20 cubic meters. Accordingly, 2 cubic meters of surplus sludge must be withdrawn per day.

The mineralization tank is arranged such that an amount of purified water corresponding to the said 2 cubic meters of sludge can be withdrawn as a supernatant liquid. The concentration in the mineralizating tank can thus be maintained at about 50,000 mg./l. Air is introduced into the effluent water in the mineralizating tank at a rate of about 20 cubic meters per hour in the form of large bubbles thereby additionally reducing the sludge due to mineralization by about 50%, i.e. to about 20 kilograms per day.

This sludge portion which is not amenable to further decomposition may, if a sludge concentration of 50,000 mg. (dry basis) is transgressed, be withdrawn and used as fertilizer.

While some preferred embodiments of the invention have been described above in detail it is to be distinctly understood that the invention is not limited thereto but may be otherwise variously embodied and practised within the scope of the following claim.

I claim:

A process for the microbiological purification of domestic effluent water by means of an activated sludge system which comprises:
 (a) decomposing organic impurities in said water in a first aerating stage by means of bacteria while maintaining optimum life conditions for the bacteria by maintaining a relatively low oxygen content;
 (b) conveying the thus treated water to a first sedimentation stage for sedimentation of bacteria sludge;
 (c) removing sedimented bacterial sludge from the first sedimentation state, separately aerating said sludge to effect a mineralization of said sludge and discharging the mineralized sludge from the system;
 (d) conveying the water from the first sedimentation stage to a second separate aerating stage in substantially oxygen free condition for destruction of bacteria in said water by means of bacteriophagic organisms while maintaining optimum life conditions for said bacteriophagic orangisms in said second aerating stage by maintaining a relatively high oxygen content; and
 (e) conveying the thus treated water to a second sedimentation stage, whereby biologically purified water is obtained.

References Cited

UNITED STATES PATENTS

| | | | |
|---|---|---|---|
| 2,901,114 | 8/1959 | Smith et al. | 210—15 X |
| 3,047,492 | 7/1962 | Gambrel | 210—7 |
| 3,173,866 | 3/1965 | Lefton et al. | 210—14 X |

OTHER REFERENCES

Simpson, R. W.: Activated Sludge Modification, Water and Sewage Works, October 1959, vol. 106, pp. 421–426.

Isaac, P. C. G.: Waste Treatment, 1960, Pergamon Press, New York, pp. 56–60, 62, 70, 71 and 92–98; p. 70–71 particularly relied on.

Babbitt, H. E.: Sewerage and Sewage Treatment, 6th ed., 1947, John Wiley and Sons, New York, pp. 454, 459 and 476.

MICHAEL E. ROGERS, *Primary Examiner.*

MORRIS O. WOLK, *Examiner.*